Jan. 13, 1942.  B. E. SHAW  2,269,863
SURFACE SWITCH
Filed Sept. 11, 1939
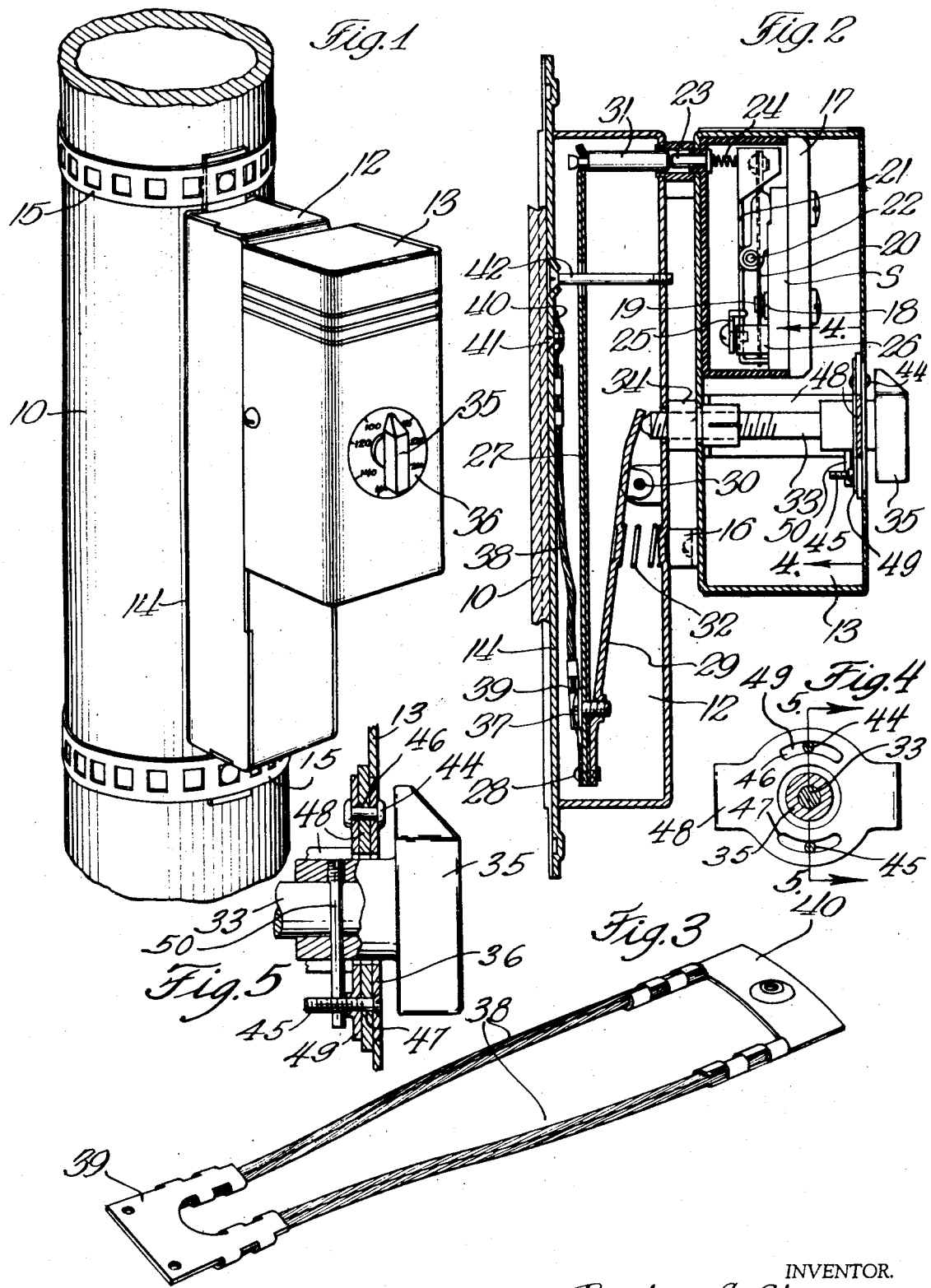
INVENTOR.
Burton E. Shaw
BY Bair & Freeman
ATTORNEYS Patented Jan. 13, 1942

2,269,863

UNITED STATES PATENT OFFICE 2,269,863

SURFACE SWITCH

Burton E. Shaw, Bristol, Ind., assignor to Penn Electric Switch Co., Goshen, Ind., a corporation of Iowa Application September 11, 1939, Serial No. 294,407

7 Claims. (Cl. 200—139)

An object of my present invention is to provide a switch structure which is particularly adapted as a surface switch or one which is adapted to be applied to the surface of a hot water or steam pipe or the like, means being provided within the surface switch for effecting a ready and quick response of the thermal element thereof to changes in temperature of the pipe.

A further object is to provide a switch structure of inexpensive construction to secure the desired result of quick response to temperature changes and a means to accurately calibrate the switch at the time that it is attached to the boiler on which installation is made.

Another object is to provide a switch structure with a thermal element and means to readily conduct heat from a steam pipe or other object on which the switch is installed to the thermal element in the form of a flexible lead of copper or other good heat conducting material, the flexibility of the lead, however, eliminating any possibility of hindering the free movement of the thermal element in response to temperature changes.

Other objects, purposes and characteristic features of the present invention will be in part obvious from the accompanying drawing and in part pointed out as the description of the invention progresses. In describing the invention in detail, reference will be made to the accompanying drawing in which like reference characters designate corresponding parts throughout the several views, and in which:

Figure 1 is a perspective view of a surface switch embodying my invention and illustrating it connected to a vertical riser pipe of a steam or hot water boiler;

Figure 2 is a vertical sectional view through the switch;

Figure 3 is a perspective view of a heat conducting lead of the switch;

Figure 4 is a sectional view on the line 4—4 of Figure 2 showing a dial mounting; and Figure 5 is an enlarged sectional view on the line 5—5 of Figure 4.

On the accompanying drawing, I have used the reference numeral 10 to indicate an object, the temperature of which is to be utilized for controlling purposes. The object 10 may be a hot water or steam pipe, my switch being adapted for mounting against the surface thereof.

My switch structure includes a thermal element casing 12 and a switch casing 13. The thermal element casing 12 has a bottom wall 14, preferably curved to fit the surface of the pipe 10. The wall 14 is held in good heat conducting contact with the surface of the pipe 10 by clamp bands 15.

The switch casing 13 is mounted on the thermal element casing 12 as by brackets 16. A switch unit S is mounted in the switch casing 13. The switch unit S is fully disclosed and claimed in my copending application Serial No. 226,132, filed August 22, 1938, and allowed June 7, 1939.

Briefly, the switch unit S includes a base 17, stationary contact 18 and movable contact 19. The contact 19 is normally engaged with the contact 18 by mounting it on a leaf spring 20. To disengage the contacts, a switch arm 21 pivoted at 22 is moved clockwise by pressing inwardly on a pin 23. This compresses a spring 24 which upon its tension becoming sufficient will swing the switch arm 21 clockwise. An armature 25 on the switch arm tends to cause rocking of the switch arm in a counterclockwise direction because of the action of a permanent magnet 26 thereon.

For operating the switch unit S, I provide a thermal element 27 which is preferably formed of suitable bimetallic material. One end of the thermal element 27 is anchored as at 28 to a rock lever 29. The rock lever 29 is pivoted at 30. The free end of the thermal element 27 operates the switch unit S through the pin 23 by means of a thrust pin 31.

The rock lever 29 is constrained clockwise by spring 32. A range adjusting screw 33 cooperates with the rock arm against the bias of the spring 32 to secure the desired range adjustment. The screw 33 is threaded in a sleeve 34 mounted through one wall of the switch casing 13. An adjusting knob 35 is provided for the screw 33 and cooperates with a temperature indicating dial 36.

The thermal element 27 is under tension produced by a pre-calibrating screw 37 passing through the thermal element and threaded into the rock arm 29. As the screw 37 is tightened, the distance between the upper end of the rock arm and the thermal element is reduced for calibrating purposes, as will hereinafter appear.

Heretofore it has been customary to depend upon the surface temperature of the pipe 10 to heat the air in the thermal element casing 12 and thereby effect a change in position or curvature of the thermal element. This has been found very slow or lagging in operation, and not altogether accurate, as variations may occur due to air circulation dissipating heat from the outer surface of the thermal element casing 12.

To overcome these difficulties, I provide a means for readily conducting heat from the surface of the pipe 10 to the thermal element 27. This means consists of a pair of leads 38 having their ends connected in terminal plates 39 and 40. The plate 39 is riveted by means of the rivets 28 to the thermal element 27 and the terminal plate 40 is secured as by a screw 41 to the wall 14 of the thermal element casing 12. The leads 38 are flexible so as not to interfere with the flexible action of the thermal element 27 and are formed of good heat conducting material such as thin stranded copper wire. The terminal plates 39 and 40 are preferably formed of copper for good heat conducting purposes. Accordingly, any temperature changes in the surface of the pipe 10 are readily and quickly transmitted to the thermal element 27 through the flexible leads and terminal plates without depending upon or waiting for the air within the casing 12 to transmit the desired heat.

It is impossible to properly calibrate a surface switch at the factory. The wall 14 of the casing 12 should be tightly engaged with a surface of the pipe 10 which has been scraped clean so as to get good heat conduction. The wall 14 is curved so as to fit the surface of the pipe 10. The clamp bands 15 hold the wall 14 tightly in engagement with the pipe. All of these features contribute to a maximum of heat conduction from the pipe to the wall 14. However, differences in the area of contact and other factors such as the material of the pipe 10, the amount of scale within the pipe, etc., throw off the calibration of a switch on which an attempt has been made to precalibrate it at the factory. Precalibration to approximately the setting indicated by the dial 36 may be made at the factory by tightening or loosening the screw 37, thus positioning the blades 27 and 29 closer together or farther apart.

When the switch is installed the boiler thermometer can be observed and the knob 35 adjusted to a position where the switch S operates. If the indicia on the dial 36 then corresponds to the pointer on the knob 35 no readjustment is necessary.

Usually, however, it does not correspond to the variations in conditions encountered as above outlined, and therefore I provide the dial 36 rotatable within given limits so that it can be rotated to a position that does correspond to the boiler thermometer, to the operation of the switch S and the position of the knob 35.

The dial 36 as shown in Figures 4 and 5, is mounted by means of a rivet 44 and a screw 45. The rivet 44 extends through an arcuate slot 46 and the screw 45 extends through an arcuate slot 47. The slots 46 and 47 are provided in a yoke 48 stationarily mounted in the casing 13. Against the face of the yoke 48 opposite the dial 36 is a washer 49 connected with the rivet 44 and screw threaded to receive the screw 45.

From the construction of the parts just described, it will be obvious that the screw 45 may be loosened and the dial 36 with its associated parts 44, 45 and 49 rotated to a position corresponding with the knob 35 to a position where the indicia on the dial corresponding to the boiler thermometer registers with the pointer of the knob 35. The screw 45 may then be retightened.

The knob 35 is retained in position on the range adjusting screw 33 by a pin 50 which has an extension shown in Figure 5, adapted to engage the screw 45 so that the screw acts as a stop to limit the rotation of the knob 35 to approximately one revolution.

In the foregoing described manner my surface switch when installed may be accurately calibrated for the particular installation made and thereafter the range of operation of the switch can be changed as desired by adjusting the knob 35 with the assurance that the dial 36 reads correctly as to temperature settings.

I have illustrated and described my improvement in an embodiment which I have found very satisfactory. I have not attempted to illustrate or describe certain adaptations or modifications which I contemplate, or the various uses and adjustments possible, as it is believed that the foregoing disclosure will enable those skilled in the art to which this invention appertains to embody or adapt my improvements as may be desired.

Having thus described my invention, I now claim and desire to secure by Letters Patent:

1. In a surface switch, a thermal element casing, a switch casing mounted thereon, a switch in said switch casing, means for attaching said thermal element casing to a heating medium conduit, a thermal element in said thermal element casing, an operative connection from said thermal element through the adjacent walls of said casing to said switch and means for readily conducting heat from said heating medium conduit to said thermal element comprising a stranded flexible metallic lead having one end secured in heat conducting relation to a movable part of said thermal element, having its other end secured in heat conducting relation to the wall of said thermal element casing which contacts with the heating medium conduit, and having its intermediate portion free of said thermal element and said thermal element casing.

2. In a surface switch, a thermal element casing, means for attaching said casing to a heating medium conduit, a rock lever pivoted in said casing, a range adjusting screw for determining the position of said rock lever, a thermal element mounted on said rock lever for movement therewith, a switch controlled by said thermal element, means for readily conducting heat from said heating medium conduit to said thermal element comprising a flexible lead of heat conducting material having its opposite ends secured respectively in heat conducting relation to the thermal element at a point spaced from the pivot of said rock lever and to the wall of the thermal element casing which contacts with the heating medium conduit and a casing for said switch, said range adjusting screw being supported thereby and extending therethrough.

3. In a switch structure, a thermal element casing, means for attaching said casing to a heating medium conduit or the like, a rock lever pivoted in said casing, a range adjusting screw for determining the position of said rock lever, a thermal element mounted on said rock element, a switch controlled thereby, and means for conducting heat from said heating medium conduit to said thermal element comprising a flexible lead having its opposite ends secured respectively to the thermal element spaced from the rock lever pivot and to the wall of the thermal element casing which contacts with the heating medium conduit and having its intermediate portion free of said thermal element and said wall.

4. In a surface switch, a thermal element casing, a switch casing mounted thereon, a switch in said switch casing, means for mounting said thermal element casing in contact with the surface of a pipe or the like, a thermal element in said thermal element casing, a rock lever pivotally mounted in said thermal element casing, said thermal element being secured thereto, a screw for drawing said thermal element toward said rock lever and thereby adjusting the relative positions thereof for precalibration purposes, an operative connection from said thermal element to said switch through the adjacent walls of said casings and means for readily conducting heat from said pipe to said thermal element comprising a flexible heat conducting lead secured to the wall of the thermal element casing adjacent the pipe and to the thermal element at the point of securing said thermal element to said rock lever.

5. In a switch structure, a thermal element casing, a switch, means for mounting said thermal element casing in contact with a surface subject to temperature changes, a rock lever pivotally mounted in said thermal element casing, a thermal element mounted thereon to be rocked thereby, means for adjusting the position of said rock lever and thermal element for range changing purposes, an operative connection from said thermal element to said switch and means for readily conducting heat from said surface to said thermal element comprising a flexible metallic lead secured to the wall of the thermal element casing in contact with said surface and to said thermal element whereby to rock with it during such range adjustments without restricting its movements as a result of being heated by heat through said lead.

6. In a control device of the class described, a thermal element casing, means for attaching said casing to an object, the temperature of which is to be utilized to control a thermal element, a movable thermal element in said casing and means for conducting heat from said object to said thermal element comprising a flexible metallic lead connected at one end with the wall of the thermal element casing which is in contact with the object and at its other end with the thermal element whereby said other end only moves with the thermal element without interfering with its action in response to temperature changes.

7. In a control device of the class described, a thermal element casing, means for attaching said casing to a surface, the temperature of which is to be utilized to control a thermal element, a thermal element in said casing, means to move said thermal element and thereby change the range of operation thereof, a dial associated with said means, means for changing the position of said dial and means for conducting heat from said surface to said thermal element comprising a flexible heat conducting lead connected with the wall of the thermal element casing and with the thermal element to move with it during range changing operations.

BURTON E. SHAW.